US006879609B2

(12) United States Patent
Schardt et al.

(10) Patent No.: US 6,879,609 B2
(45) Date of Patent: Apr. 12, 2005

(54) SILICATE GLASS FOR UPCONVERSION FLUORESCENCE

(75) Inventors: Craig R. Schardt, St. Paul, MN (US); Mark T. Anderson, Woodbury, MN (US); James R. Onstott, Dresser, WI (US); Lowell C. Frank, Hudson, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 39 days.

(21) Appl. No.: 10/608,930

(22) Filed: Jun. 27, 2003

(65) Prior Publication Data

US 2004/0037538 A1 Feb. 26, 2004

Related U.S. Application Data

(63) Continuation-in-part of application No. 10/038,370, filed on Dec. 31, 2001, now Pat. No. 6,724,972.
(60) Provisional application No. 60/345,076, filed on Dec. 31, 2001.

(51) Int. Cl.[7] ................................................. G02B 6/00
(52) U.S. Cl. ..................... 372/40; 359/341.1; 359/341.5
(58) Field of Search ............................. 372/40; 359/341

(56) References Cited

U.S. PATENT DOCUMENTS

| 5,388,110 | A | 2/1995 | Snitzer |
| 5,426,656 | A | 6/1995 | Tohmon et al. |
| 6,154,598 | A | 11/2000 | Gavrilovic et al. |
| 6,463,201 | B1 | 10/2002 | Aiso et al. |
| 2002/0021882 | A1 | 2/2002 | Wyatt et al. |
| 2002/0064366 | A1 | 5/2002 | Cole et al. |

FOREIGN PATENT DOCUMENTS

| JP | 04-349141 | 12/1992 |
| JP | 07-058399 | 3/1995 |
| JP | 2001-210898 | 8/2001 |
| KR | 2000-0027961 | 5/2000 |
| WO | WO 00/55101 | 9/2000 |
| WO | WO 03/002475 A1 | 1/2003 |

OTHER PUBLICATIONS

J.R. Bonar, et al; "Blue Light Emission in Thulium Doped Silica–on–Silicon Waveguides", *Optics Communications* (Sep. 1, 1997); vol. 141, pp. 137–140.

A.F. El–Sherif & T.A. King; "Dynamics and Self–Pulsing Effects in $Tm^{3+}$–Doped Silica Fibre Lasers", *Optics Communications* (Jul. 15, 2002); vol. 208; pp. 381–389.

D.C. Hanna, et al; "Frequency Upconversion in Tm– and Yb: Tm–Doped Silica Fibers", *Optics Communications* (Aug. 15, 1990); vol. 78, No. 2; pp. 187–194.

H. Jeong & K. Oh; "Characterization of Amplified Spontaneous Emission Light Source from an $Er^{3+}/Tm^{3+}$ Co–doped Silica Fiber"; *Conference on Lasers and Electro–Optics, Technical Digest, Postconference Ed.* (May 7–12, 2000); TOPS vol. 39; pp. 544–545; Optical Society of America.

J.R. Lincoln, et al; "Time Resolved and Site Selective Spectroscopy of Thulium Doped Into Germano– and Alumino–Silicate Optical Fibres and Preforms", *Journal of Luminescence* (1991); vol. 50; pp. 297–308.

(Continued)

*Primary Examiner*—Kenneth Parker
*Assistant Examiner*—Thanh-Nhan P Nguyen
(74) *Attorney, Agent, or Firm*—Gregg H. Rosenblatt (57) ABSTRACT

A thulium doped silicate glass composition which contains $SiO_2$, $Al_2O_3$, and $La_2O_3$ emits visible and UV light when excited by infrared light. The glass composition may also contain $GeO_2$ and $Er_2O_3$. When excited by infrared light of about 1060 nm, the glass emits visible light at fluorescent transitions of the $Tm^{3+}$ ions with major broad features at 365, 455, 472, 651, and 791 nm.

29 Claims, 7 Drawing Sheets

OTHER PUBLICATIONS

"Lucent Technologies announces two new erbium–doped fibers for the extended L–band the C–band"; Lucent Technologies [online]; [available on the internet Oct. 1, 2001]; [retrieved from the internet Jan. 23, 2003 at www.lucent.com/press/1001/011001.nsf.html].

D.N. Messias, et al; "Blue Energy Upconversion Emission in Thulium–Doped $SiO_2$–$P_2O_5$ Channel Waveguides Excited at 1.064 $\mu$m", *IEEE Journal of Quantum Electronics* (Dec. 2002); vol. 38, No. 12; pp. 1647–1650.

A. Mori, et al; "1.5 $\mu$m Broadband Amplification by Tellurite–Based EDFAs"; *Conference on Optical Fiber Communications, Technical Digest, Postconference Ed.* OSA Technical Digest Series (1997); vol. 6; pp. 371–374; Optical Society of America.

R.L. Shubochkin, et al; "$Er^{3+}$—$TM^{3+}$ Co–doped Silica Fiber Laser"; *OSA TOPS* (1999); vol. 26 Advanced Solid–State Lasers; pp. 167–171; Optical Society of America.

A.P. Otto, et al, "Red to Blue Upconversion in Tm–Doped Sol–Gel Silicate Glasses"; *Journal of Non–Crystalline Solids* (2000); vol. 265; pp. 176–180.

S. Tanabe & E. Snitzer, "Blue Upconversion Characteristics of Thulium–Doped Silica Fiber with High Germania Content"; *Japan Journal of Applied Physics* (1998); vol. 37, Suppl., 37–1; pp. 81–83.

M.V.D. Vermelho, et al; "Efficient and Thermally Enhanced Frequency Upconversion in $Yb^{3+}$– Sensitized $Tm^{3+}$–Doped Silica–on–Silicon Buried Waveguides Excited at 1.064 $\mu$m"; *Optical Materials* (2001); vol. 17; pp. 419–423.

X. Zou, et al; "Mechanisms of Upconversion Fluorescences in $Er^{3+}$, $Tm^{3+}$ Codoped Fluorozircoaluminate Glasses"; *Journal of Non–Crystalline Solids* (1995); vol. 181; pp. 100–109.

SILICATE GLASS FOR UPCONVERSION FLUORESCENCE

CROSS-REFERENCE TO RELATED APPLICATION(S)

This application is a continuation-in-part of U.S. application Ser. No. 10/038,370, filed Dec. 31, 2001 now U.S. Pat. No. 6,724,972, entitled "Silicate Waveguide Compositions For Extended L-Band and S-Band Amplification"; U.S. application Ser. No. 10/299,224, filed Nov. 19, 2002, entitled "Germanium Free Silicate Waveguide Compositions For Extended L-Band and S-Band Amplification"; and U.S. application Ser. No. 10/299,654, filed Nov. 19, 2002, entitled "Method of Manufacturing Germanium-Free Silicate Waveguide Compositions for Enhanced L-Band and S-Band Emission", all of which are hereby incorporated by reference. Both Ser. No. 10/299,224 and Ser. No. 10/299,654 claim priority to a U.S. provisional filing No. 60/345,076, filed Dec. 31, 2001, entitled "Silicate Waveguide Compositions For Extended L-Band and S-Band Amplification."

FIELD OF THE INVENTION

The present invention relates to an optical upconverter that emits visible and ultraviolet light when excited by longer wavelength light. In particular, the invention is a thulium doped glass composition containing $SiO_2$, $Al_2O_3$, and $La_2O_3$ that produces visible and ultraviolet light when excited by light of an appropriate wavelength, such as about 1060 nm.

BACKGROUND OF THE INVENTION

The visible light emission from $Tm^{3+}$-doped glass is remarkable because it involves a process in which multiple photons of lower energy are absorbed by the material and then re-emitted as a photon of higher energy. This process is known as upconversion and may occur by several different paths such as sequential upconversion and cooperative upconversion.

In sequential upconversion, a single ion (for example, $Tm^{3+}$) absorbs a photon via excitation of an electron from the ground state to a metastable excited state. Before the excited electron returns to the ground state, the same ion absorbs a second photon, and the electron is further excited to a higher energy state. This second excitation is known as excited state absorption (ESA) and can occur several times, with the electron moving to successively higher energy levels. When the excited electron undergoes radiative decay, it can emit a photon having more energy than the excitation photon. The exact energy of the emitted photon will depend on the energy levels of the fluorescent ion. In sequential upconversion, a single ion must absorb two or more photons, so the efficiency of the upconversion process is highly dependent on the lifetime of the metastable intermediate state.

Cooperative upconversion involves energy transfer between two or more excited ions. If the ions are close enough, one excited ion can transfer energy to a second excited ion. The electron on the first ion moves to a lower energy level while the electron on the second ion moves to a higher energy level. The ions exchanging energy may be of the same type or may be of different types. Because energy must transfer between ions, this process is highly dependent on the concentration and distribution of excitable ions in the glass host as well as the lifetime of the metastable state.

Upconversion fluorescence is known in $Tm^{3+}$-doped silicate and $Tm^{3+}$-doped fluoride fibers. To date, most of the research has been done on fluoride fibers because the lower phonon energy of the host fluoride glass reduces the non-radiative decay rate of the excited states of the $Tm^{3+}$ ion. With decreased non-radiative decay, the intermediate metastable states have longer lifetimes, and therefore the fluoride fibers are believed to be more efficient. The fluoride glasses are good hosts for $Tm^{3+}$, and $Tm^{3+}$-doped infrared-pumped visible fluoride fiber lasers have been demonstrated. However, the fluoride fibers have the disadvantage that they are much more difficult to manufacture and handle, and therefore much more expensive than silicate-based fibers.

In silicate hosts, $Tm^{3+}$ has been doped into $SiO_2$—$GeO_2$ and $SiO_2$—$Al_2O_3$ fibers. Hanna, D. C. et al., *Optics Communications*, 78 (1990) 187; Lincoln, J. R. et al., *Journal of Luminescence*, 50 (1991) 297; Tanabe, S., E. Snitzer, and B. Cole, *Japanese Journal of Applied Physics*, 37 Suppl. 37-1 (1998) 81. $Tm^{3+}$ upconversion has also been studied in silica-on-silicon waveguides ($SiO_2$—$P_2O_5$) and in bulk sol-gel silica glasses ($SiO_2$—$Al_2O_3$) Bonar, J. R. et al., *Optics Communications*, 141 (1997) 137; Vermelho, M. V. D. et al., *Optical Materials*, 17 (2001) 419; Otto, A. P., K. S. Brewer, A. J. Silversmith, *Journal of Non-Crystalline Solids*, 265 (2000) 176. In some studies, $Yb^{3+}$ was co-doped into the system as a sensitizer for the $Tm^{3+}$ upconversion. Work by Lincoln et al. showed that the lifetime of the $^1G_4$ and $^3F_4$ excited states was longer in $SiO_2$—$Al_2O_3$ than in $SiO_2$—$GeO_2$ fiber. Lincoln, J. R. et al., *Journal of Luminescence*, 50 (1991) 297. However, studies in a silicate fiber found, "A problem with a silica host is that significant non-radiative decay occurs from the $^3F_4$ level [the $^3H_4$ level in the notation used in this document] (a consequence of the small energy gap between this level and the $^3H_5$ level and the high phonon energy of silica) which means that the lifetime of this level is significantly shorter than that observed in, for example, a fluorozirconate host with a corresponding reduction in the upconversion efficiency." Hanna, D. C. et al., *Optics Communications*, 78 (1990) 187.

BRIEF SUMMARY OF THE INVENTION

The present invention is based upon the discovery of strong visible blue light emission from a silicate glass containing $SiO_2$, $Al_2O_3$, $La_2O_3$, and $Tm_2O_3$ when pumped with infrared radiation of an appropriate wavelength, such as between about 1000 nm and about 1200 nm. The upconversion light source of the present invention includes the thulium-doped silicate glass, together with a pump source. Radiation from the pump source is absorbed by and excites $Tm^{3+}$ ions in the silicate glass to cause emission of radiation having a peak wavelength that is shorter than the peak wavelength of the pump radiation.

In a preferred embodiment, the pump source provides radiation that excites $Tm^{3+}$ ions in the silicate glass to $^1G_4$ and $^1D_2$ excited states to produce upconverted emitted radiation.

In another embodiment, the invention is a light emitting fiber that includes an optical glass fiber and a pump source. The optical glass fiber has a core comprising silica and oxides of Al, La, and Tm. The pump source provides first radiation having a first peak wavelength that excites $Tm^{3+}$ ions in the core of the optical glass fiber, so that the fiber emits second radiation having a second peak wavelength that is shorter than the first peak wavelength.

The invention also includes methods of upconverting radiation by irradiating a silicate glass with a first radiation to cause the silicate glass to emit second radiation of a shorter peak wavelength. The silicate glass includes silica and oxides of Al, La, and Tm.

A preferred method of the invention produces blue light. A silicate glass comprising silica and oxides of Al, La, and Tm is provided. The silicate glass is irradiated with pump radiation of a wavelength that is absorbed by $Tm^{3+}$ ions in the silicate glass to cause the $Tm^{3+}$ ions in the silicate glass to emit blue light.

DETAILED DESCRIPTION

The present invention is an upconversion device that provides a compact source of blue and ultraviolet light. In particular, the present invention provides unexpectedly strong emissions of visible light when a silica glass containing $SiO_2$, $Al_2O_3$, $La_2O_3$, and $Tm_2O_3$ is excited by infrared light of about 1000 nm to about 1200 nm wavelength. This basic glass composition may be referenced by the acronym SALT (Si, Al, La, Tm). In other embodiments, the silica glass composition also contains both $GeO_2$ and $Er_2O_3$ or just one or the other. These glass compositions are referenced by the acronyms SALGET (Si, Al, La, Ge, Er and Tm), SALGT and SALET.

When excited by infrared light of an appropriate first peak wavelength, such as about 1060 nm, the glasses of the present invention emit light having a second peak wavelength in the ultraviolet (in the wavelength range of about 360 nm to about 370 nm), the visible (in the wavelength range of about 450 and about 480 nm), as well as the near infrared regions of the electromagnetic spectrum. The emission corresponds to known fluorescent transitions of the $Tm^{3+}$ ion with peaks at about 365, 455, 472, 651, and 791 nm. The relative intensity of the peaks can be controlled by the composition of the host glass and the concentration of thulium dopant ions.

In bulk form, the glass can be used as a laser rod for a visible solid-state laser or as an image formation region of a 3-D fluorescent display. In optical fiber form, the glass may be used as a fiber laser, or as a compact, flexible blue light source that emits light out the sides of the fiber along its length.

In preferred embodiments of the present invention, the silica glass composition has a concentration of Al from about 0.5 mol % to about 20 mol %; a concentration of La greater than 0 mol % to about 4 mol %; a concentration of Ge from 0 mol % to about 15 mol %; a concentration of Er from 0 PPM to about 3,000 PPM; a concentration of Tm from about 15 PPM to about 10,000 PPM; and balance silica.

As used herein, the term "mol %" is defined as the ratio of the number of moles of a specified cation (present as an oxide) to the total number of moles of all the component cations in a volume of the glass. The term "PPM" is defined as parts-per-million measured in mol % (e.g. 10,000 PPM=1 mol %).

The presence of $La_2O_3$ in the glass composition appears to improve the solubility of the $Tm^{3+}$ (and $Er^{3+}$) ions. This reduces undesirable clustering of fluorescent ions. In particular, $La_2O_3$ controls cooperative upconversion by reducing clusters. $La^{3+}$ acts like $Tm^{3+}$ when rare earth clustering occurs (which happens at low rare earth concentrations in $SiO_2$). The solid-state chemistry of $La^{3+}$ is similar to that of $Tm^{3+}$, as they have comparable ionic radii, are tri-valent, and are glass modifiers. Therefore we expect them to be statistically mixed or distributed in rare-earth clusters. Unlike $Tm^{3+}$, $La^{3+}$ ions in a silicate glass do not emit radiation. In addition, the $La_2O_3$ reduces the phonon energy of the host glass, which has been a problem in prior thulium-doped silicate glass compositions that did not contain any $La_2O_3$. The addition of the $La_2O_3$ into glass increases the metastable state lifetime in the upconversion silicate glasses of the current invention, and thereby improves upconversion efficiency.

An additional advantage of the glass composition of the invention is the presence of both $Al_2O_3$ and $La_2O_3$. By varying the amount of $La_2O_3$ and $Al_2O_3$ and the ratio of one to the other, the refractive index of the glass composition can be selected. The difference between the refractive index of the core of the optical fiber and the refractive index of the cladding of the optical fiber surrounding the core determines the numerical aperture of the optical fiber. The ability to adjust the numerical aperture allows the fiber to contain the pumping radiation within the core, to encourage the upconversion process.

Both $Al_2O_3$ and $La_2O_3$ are refractive index raising components. The refractive indices of $Al_2O_3$ and $La_2O_3$ are different. If a certain total amount of $Al_2O_3$ and $La_2O_3$ is needed in the glass, the ratio of $Al_2O_3$ to $La_2O_3$ can be adjusted while maintaining that desired total amount of those two components in order to achieve the desired refractive index. This is an advantage over a host glass that contains only one index-raising component (for example $SiO_2$—$GeO_2$.

Also included in some embodiments of the invention are $GeO_2$ and $Er_2O_3$. Both of these components may be beneficial, but are not required for the glass composition to exhibit upconversion that produces blue light.

The presence of $GeO_2$ in the base glass composition creates a more complicated composition, which appears to enhance the blue upconversion. However, Ge also tends to cause photodarkening of silicate glasses when exposed to blue or ultraviolet (UV) light. For those applications involving a single use, photodarkening is likely not an issue and addition of $GeO_2$ can increase the intensity of blue and UV upconverted light. Conversely, in applications involving repeated use of the glass to emit blue or UV light (such as a laser or lighting element), photodarkening is an issue that may result in use of only a limited amount of $GeO_2$ or the elimination of $GeO_2$ from the glass composition.

The presence of $Er_2O_3$ as a dopant may also affect upconversion to a limited extent by assisting in energy transfer (in cooperative upconversion). Some literature suggests that $Er^{3+}$ sensitizes fluorescence of the $Tm^{3+}$ ion. The tests that were performed and are reported in the following discussion confirm that $Tm^{3+}$ upconverts without $Er^{3+}$. The concentration of $Tm^{3+}$ in the glasses controlled the intensity of upconverted light produced in response to pumping light at 1060 nm (which $Tm^{3+}$ absorbs). In contrast, pumping with 980 nm radiation did not produce blue emission. There is no absorption band of $Tm^{3+}$ at 980 nm, but there is strong absorption of 980 nm radiation by $Er^{3+}$. This indicates that $Tm^{3+}$, and not $Er^{3+}$ is the primary factor in upconversion to produce blue and UV light. The energy transfer from $Er^{3+}$ to $Tm^{3+}$ is not sufficient by itself to produce significant blue emission when exposed to infrared light.

In addition, varying ratios of Er to Tm dopants did not appear to have a substantial effect on the intensity of emissions, particularly those in the blue portion of the visible spectrum.

Figure 1:
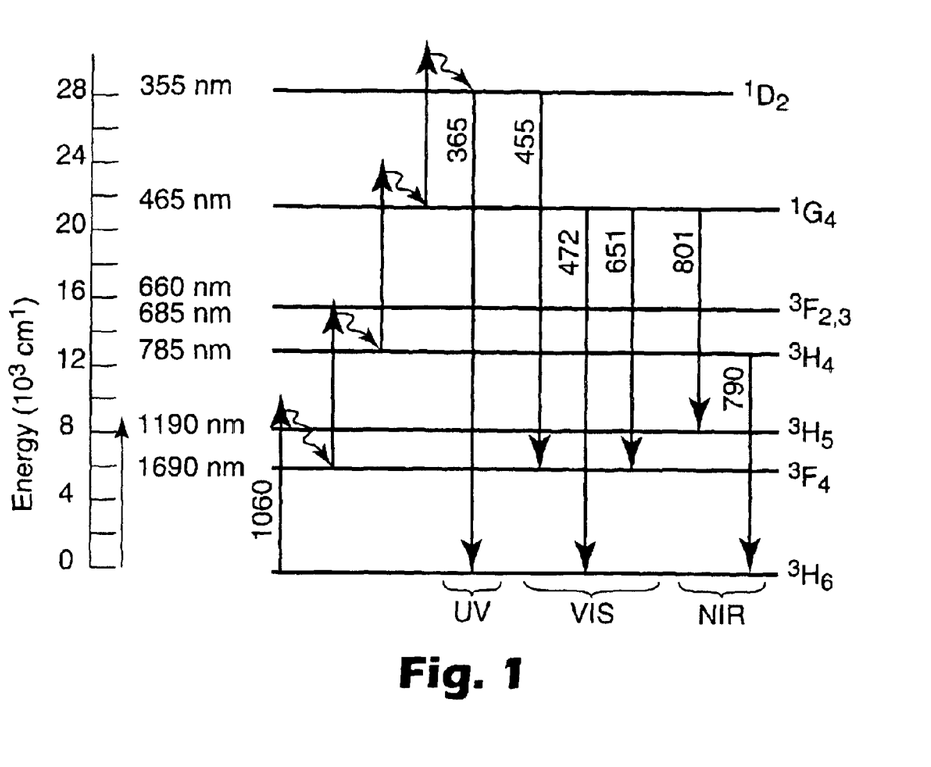
FIG. 1 is a schematic depiction of sequential upconversion and light emission in a $Tm^{3+}$ ion.

FIG. 1 is a schematic depiction of sequential upconversion and light emission in a $Tm^{3+}$ ion. In this energy diagram, the pumping light has a wavelength of about 1060 nm. In FIG. 1, six radiative transitions are shown: 801 nm and 790 nm in the near infrared; 651 nm, 472 nm, and 455 nm in the visible; and 365 nm in the ultraviolet portion of the spectrum. Each of these light emissions requires at least two photon absorptions as shown in the diagram of FIG. 1. In the sequential upconversion process with 1060 nm pumping, the $Tm^{3+}$ ion absorbs a first photon via excitation of an electron from the ground state to the $^3H_5$ excited state. Through non-radiative decay, the electron is energized to the metastable $^3F_4$ excited state. Before that excited electron returns to the ground state, the same $Tm^{3+}$ ion absorbs a second photon, which results in the electron being excited to the $^3H_4$ state. The second excitation is known as an excited state absorption (ESA). In FIG. 1, two additional ESA events are shown, which can result in an electron being excited to the $^1G_4$ state or the $^1D_2$ state.

From the $^1D_2$ state, radiative decay can occur to the $^3F_4$ state to produce visible blue light at 455 nm or to the ground state $^3H_6$ to produce UV light at 365 nm.

Radiative decay can occur from the $^1G_4$ state to the $^3H_5$ state to produce 801 nm radiation, to the $^3F_4$ state to produce 651 nm radiation, or to the ground state $^3H_6$ to produce 472 nm radiation.

Radiative decay from the $^3H_4$ state to the ground state $^3H_6$ produces emission at 790 nm.

Cooperative upconversion also appears to be present in the Tm-doped glasses of the invention. In particular a non-radiative energy transfer occurs from the $^1G_4$ state of one $Tm^{3+}$ ion to the $^3F_4$ state of another nearby $Tm^{3+}$ ion to excite an electron of the second $Tm^{3+}$ ion from the $^3F_4$ state to the $^1D_2$ state. From the $^1D_2$ state, either UV light at 365 nm or blue light at 455 nm is produced by radiative decay.

Based upon the energy diagram shown in FIG. 1, it is expected that production of radiation at 365 nm and 455 nm from the $^1D_2$ excited state will require a four-photon upconversion process (either by sequential or cooperative upconversion). Similarly, each of the three wavelengths produced by radiative decay from the $^1G_4$ excited state are shown as requiring a three-photon process. Radiation from the $^3H_4$ state is shown as requiring a two-photon process.

EXAMPLES

Table 1 lists the ratios of dopant ions (Al, La, Er, Tm) in methanolic solutions used to prepare fibers of the present invention.

TABLE 1

Batched Molarity of Methanolic Dopant Solutions

| Fiber | $AlCl_3 \cdot xH_2O$ (M) | $La(NO_3)_3 \cdot xH_2O$ (M) | $Er(NO_3)_3 \cdot xH_2O$ (M) | $Tm(NO_3)_3 \cdot xH_2O$ (M) | Er/Tm |
|---|---|---|---|---|---|
| A | 1.023 | 0.240 | 0.00672 | 0.01344 | 0.5 |
| B | 1.20 | 0.24 | 0.006 | 0.03 | 0.2 |
| C | 1.08 | 0.213 | 0.00335 | 0.00669 | 0.5 |
| D | 1.08 | 0.213 | 0.00335 | 0.001673 | 2 |
| E | 1.195 | 0.2145 | 0.00781 | 0.0 | — |
|   | 0.964 | 0.223 | 0.0223 | 0.00447 | 5 |
| F | 1.40 | 0.2567 | 0.07 | 0.14 | 0.5 |

Note:
For B–F a porous germanosilicate soot was prepared by MCVD with approximate molar ratio of $SiO_2/GeO_2 = 98.3/1.7$. The above dopant solutions were infiltrated into the porous soot by the solution doping method. A porous silicate soot was used for perform A.

Each of the fibers was fabricated by the solution-doping method. A hollow synthetic fused silica tube was cleaned, such as by an acid wash, to remove any foreign matter. The tube was mounted in a modified chemical vapor deposition (MCVD) lathe for deposition of the inner layers that formed the inner cladding and the core. In the case of Fiber A, a porous $SiO_2$ layer was deposited by chemical vapor deposition and then infiltrated with a solution that contains Al, La, Er, and Tm ions. Fibers B, C, D, and F were formed in a similar manner except that a porous $SiO_2$—$GeO_2$ layer was deposited and then infiltrated. In the case of Fiber E, a dual layer core was produced. The first core layer was formed with a porous $SiO_2$ layer that was infiltrated with a solution containing Al, La, and Er ions. The second core layer was formed by depositing a porous $SiO_2$—$GeO_2$ layer and then infiltrating that layer with a solution containing Al, La, Er, and Tm ions.

In each case, after the porous MCVD deposited layers were doped, the preform tube was dried, consolidated, and collapsed into a seed preform. Subsequent thermal processing was performed to adjust the core-to-clad ratio to achieve a desired core diameter in the final fiber. That subsequent processing involved multiple stretch and over-collapse steps. The completed preform was then hung in a draw tower and drawn into an optical fiber. The draw tower included a furnace to melt the preform and a number of processing stations, such as for coating, curing, and annealing.

For fibers B, C, and F, molar compositions were determined by wavelength dispersive X-ray spectroscopy. The results are shown in Table 2.

TABLE 2

Molar Compositions[1] and Numerical Apertures of the Cores of Selected Preforms Determined by Wavelength Dispersive X-Ray Spectroscopy

| Fiber | NA | $SiO_2$ | $AlO_{1.5}$ | $LaO_{1.5}$ | $GeO_2$ | $ErO_{1.5}$ (ppm) | $TmO_{1.5}$ (ppm) | Er/Tm |
|---|---|---|---|---|---|---|---|---|
| B | 0.30 | 83.7 | 11.8 | 2.4 | 1.8 | 690 | 2950 | 0.2 |
| C | 0.25 | 76.7 | 18.2 | 3.4 | 1.4 | 900 | 1800 | 0.5 |
| F | 0.38 | 78.4 | 16.1 | 2.9 | NA | 8280 | 17100 | 0.5 |

[1]Determined by Wavelength Dispersive X-Ray Spectroscopy
Note - Measured NAs for other preforms: A - 0.26, D - 0.25, E - 0.30.

Fibers A–E emitted blue and UV light when pumped with radiation at about 1064 nm. The emission was in all directions—axially along the fiber and out the side of the fiber. Side-emitted blue and UV light was observed along the length of the fiber in differing intensities depending on the composition of the fiber.

In the case of fiber F, the $Tm^{3+}$ concentration was so high that the pump radiation was absorbed in a very short distance. As a result, side-emission of blue and UV light along a length of fiber F was not observed.

Figure 2:
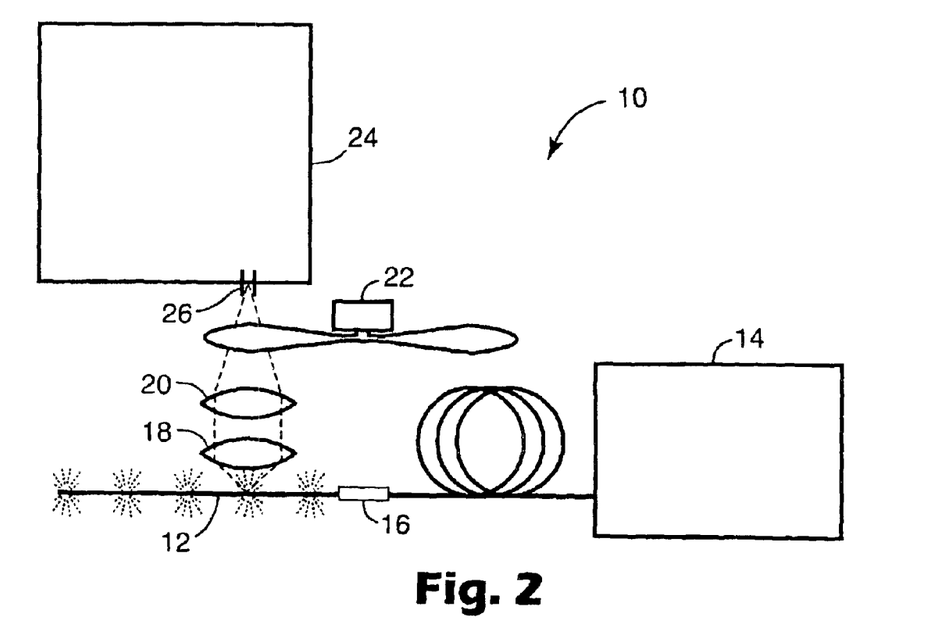
FIG. 2 shows a diagram of a system for measuring side-emitted radiation from an upconversion light source which includes a pump source and an optical fiber of the present invention.

The side-emitted light emission for fibers A–E was measured over a range of pump laser powers. FIG. 2 shows a layout of the test system 10, including fiber 12 being tested, fiber laser 14, coupler 16, lenses 18 and 20, mechanical chopper 22, and spectrometer system 24.

Fiber 12 under test was pumped by fiber laser 14, which was Model YLD-2 fiber laser from IPG Photonics, Sturbridge, Mass. Fiber laser 14 emitted continuous wave (CW) light at a nominal wavelength of about 1064 nm. The laser power was varied from about 0.02 W to about 2.00 W, and was read on a power meter on fiber laser 14.

The pump light from fiber laser 14 was coupled to test fiber 12 at coupler 16 by butt coupling cleaved ends of fiber 12 and fiber laser 14. with this method was about 53%, which was determined by comparing the emission intensity of fiber C fusion spliced to fiber laser 14, and the same fiber butt coupled to fiber laser 14. The power reported on the figures is the power launched into the fiber and has been corrected for the coupling losses.

The side-emitted fluorescence from test fiber 12 was focused into spectrometer 24 by lenses 18 and 20, and was chopped by chopper 22, which was a Model SR540 mechanical chopper from Stanford Research Systems, Sunnyvale, Calif. Chopper 22 was positioned directly in front of entrance slit 26 of spectrometer 24.

Spectrometer 24 was a SPEX Industries Model 1702, 0.75 m spectrometer equipped with a 300 g/mm grating a DSS-S025A silicon photo detector from Jobin Yvon, of Edison, N.J., and a lock-in amplifier. The light emitted through the side of test fiber 12 about 20 cm from splice 16 was collected and focused into entrance slit 26 of spectrometer 14. The spectrometer slits of spectrometer 24 were set to 450 $\mu$m, giving a bandpass of about 2 nm. The fluorescence was modulated by chopper 22 at 270 Hz, and the lock-in amplifier supplied data to a personal computer (not shown) used to record the voltage from the photodetector of spectrometer 24.

Figure 3:
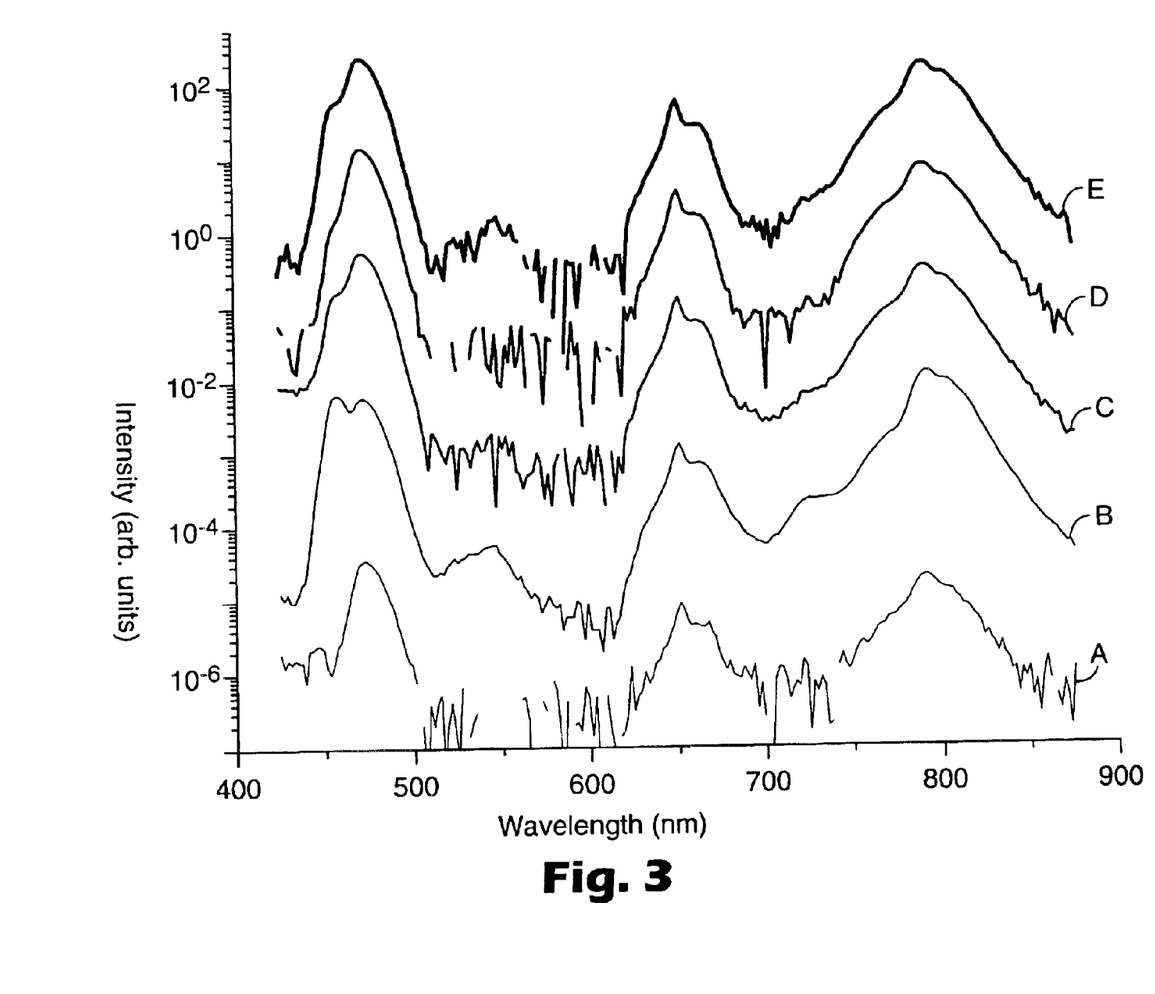
FIG. 3 shows side-emitted radiation intensity on a logarithmic scale as a function of wavelength showing fluorescence from thulium doped fibers A-E pumped with 1060 nm light. The traces are offset vertically for clarity.

FIG. 3 shows the upconverted emission of fibers A–E respectively, excited by 1.06W (2.0W pump power with 53% coupling efficiency) of 1060 nm light from fiber laser 14. FIG. 3 plots intensity in arbitrary units on a logarithmic scale. Each of fibers B–E (which include $GeO_2$) exhibited higher intensity blue and UV emissions than fiber A (which did not include $GeO_2$). Fibers A–E had a spectrum of generally the same shape, but the intensity levels varied from fiber to fiber depending on composition. The traces are offset vertically for clarity.

Figure 4A:
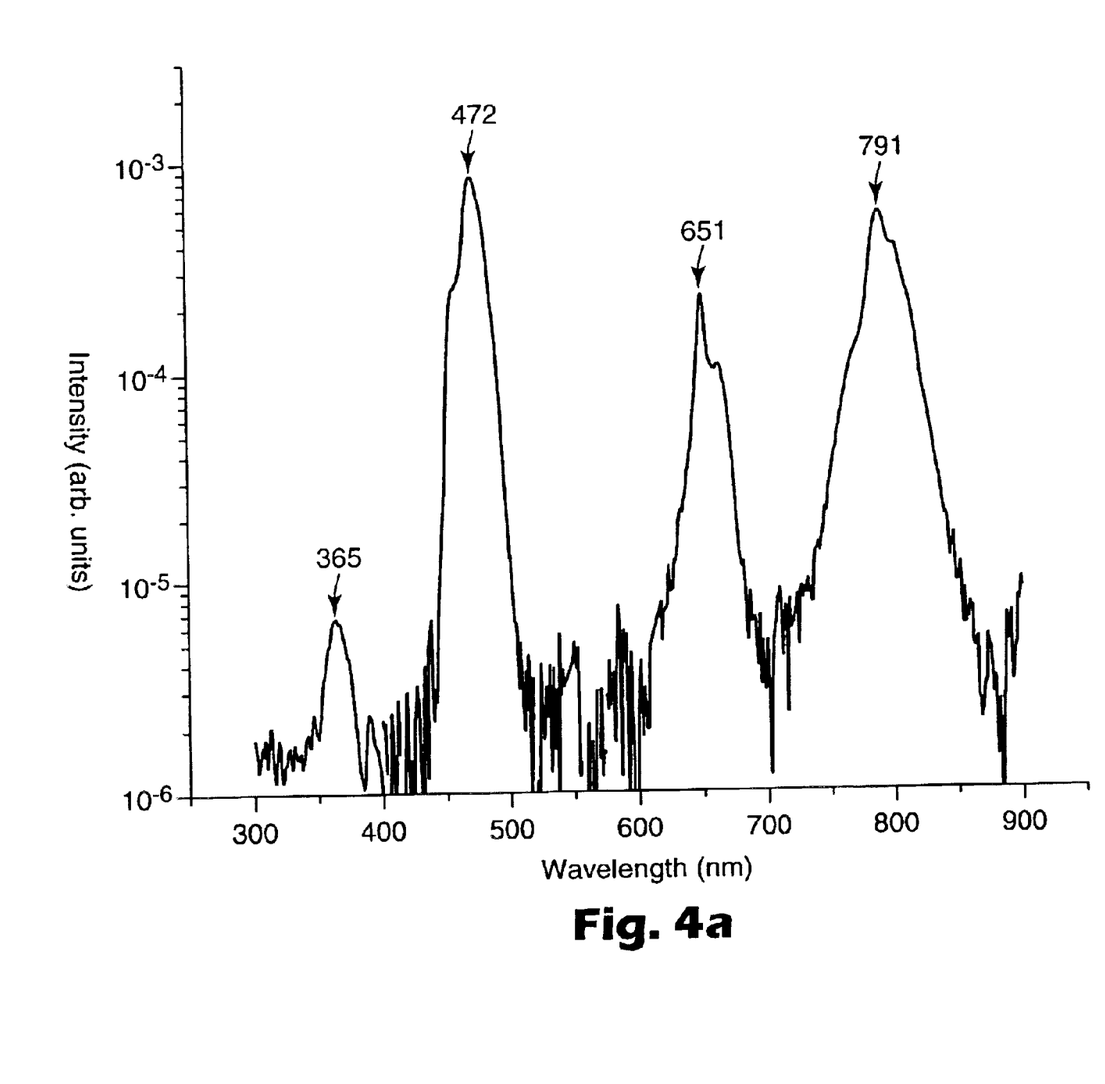
FIGS. 4a and 4b show emission spectra for fiber C and fiber B, respectively.
Figure 4B:
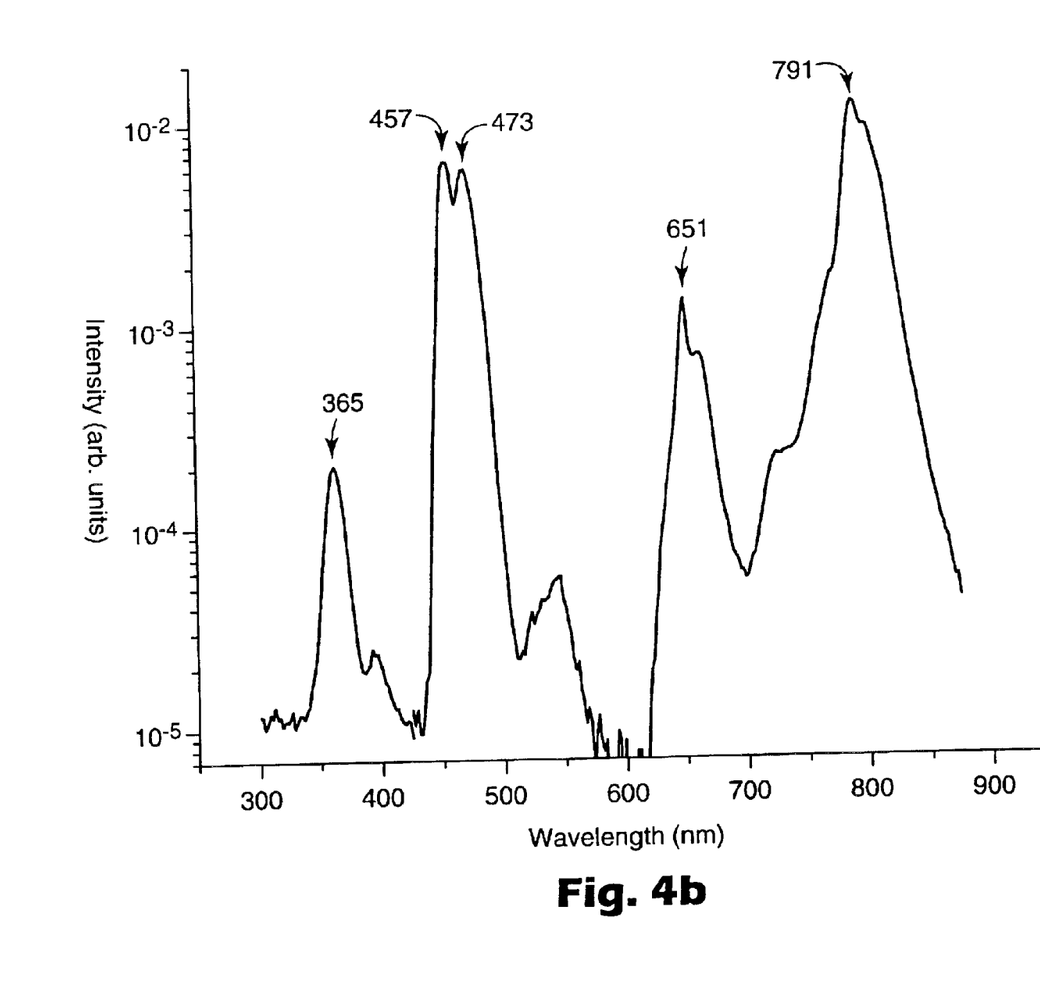

FIG. 4a shows a near infrared, visible, and UV spectrum for fiber C. The UV emission peak at 365 nm; together with visible peaks 472 nm and 651 nm; and a near infrared peak at 791 nm can be seen in FIG. 4a. FIG. 4b shows a similar spectrum for fiber B.

Figure 5:
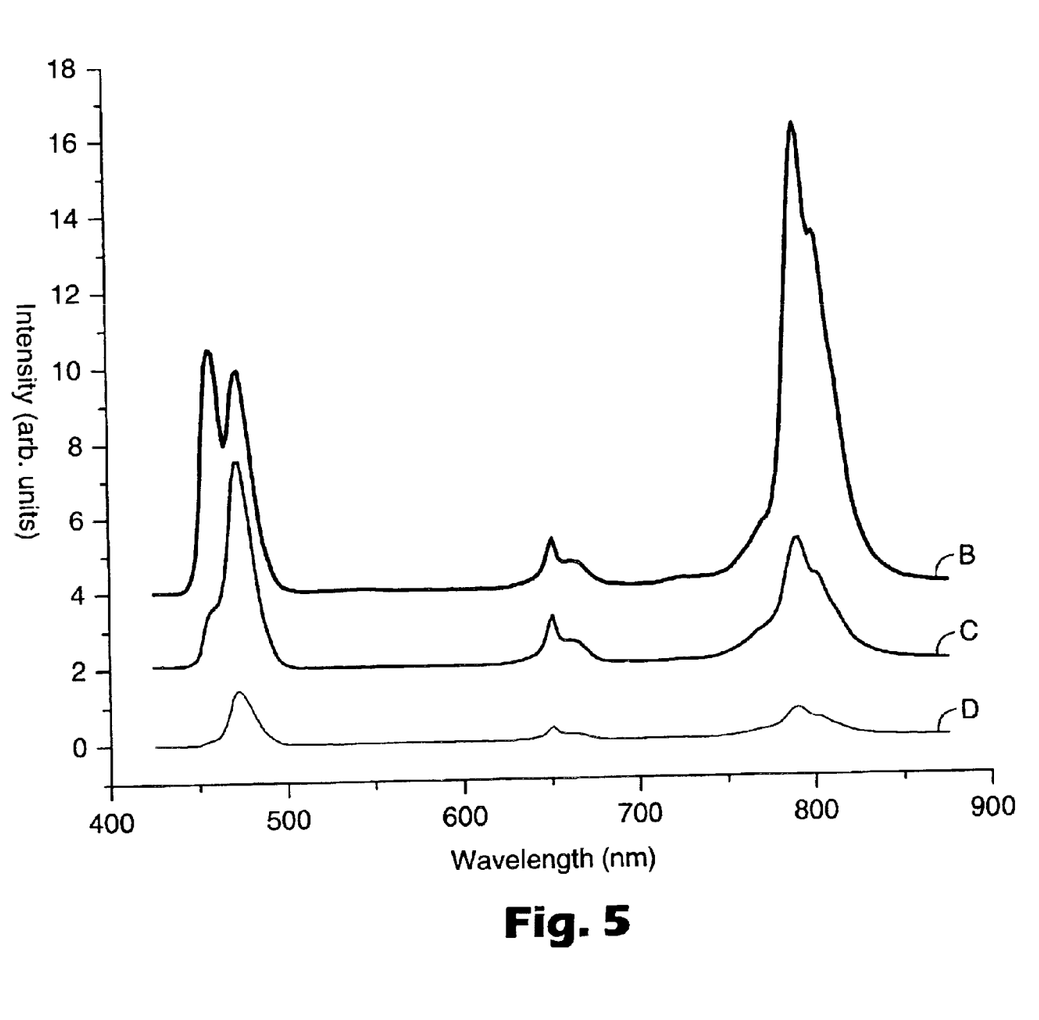
FIG. 5 is a graph of intensity on a linear scale as a function of wavelength showing fluorescence from fibers B, C, and D pumped with 1060 nm light. The traces are offset vertically for clarity.

FIG. 5 shows the fluorescence of fibers B, C, and D, with intensity in arbitrary units plotted on a linear rather than a logarithmic scale. As shown in Table 1, Fiber B has the highest concentration of Tm with 2950 ppm, while Fiber C has 1800 ppm of Tm, and Fiber D is estimated to have about 75 ppm of Tm. The effect of different levels of Tm doping can be seen in FIG. 5. The traces are offset vertically for clarity.

First, the intensity of the peak at 791 nm increases with increasing Tm concentration. The emission at 791 nm is from the $^3F_4$ excited state to the ground state.

Second, the intensity at the 651 nm emission is less in Fiber D than in Fibers B and C. The emission from Fibers B and C, however, at 651 nm is basically the same. This emission is a result of decay from the $^1G_4$ excited state to the $^3H_4$ excited state.

Third, the emission at 472 nm is less in Fiber D than in Fibers B and C. The difference in intensity of the 472 nm peak between Fibers B and C is relatively small. The 472 nm emission also originates from the $^1G_4$ excited state, as does the 651 nm emission. It appears, therefore, an increase in Tm doping between Fiber C and Fiber B has little effect at either the 651 nm or the 472 nm emissions from the $^1G_4$ state.

FIG. 5 also shows that the peak at 455 nm increases significantly with higher Tm doping. Fiber D shows little emission at 455 nm. A second peak, which is much lower than the peak at 472 nm, appears as a shoulder in the spectrum for Fiber C. Fiber B, on the other hand, shows dual peaks, of relatively equal height, at 455 nm and 472 nm.

From FIG. 5, it appears that increasing Tm doping beyond 1800 ppm results in additional emission of blue light at 455 nm and a significant increase in near infrared emission at 791 nm. This may be due to increased cooperative upconversion between $Tm^{3+}$ ions as a result of higher Tm dopant concentrations.

Figure 6:
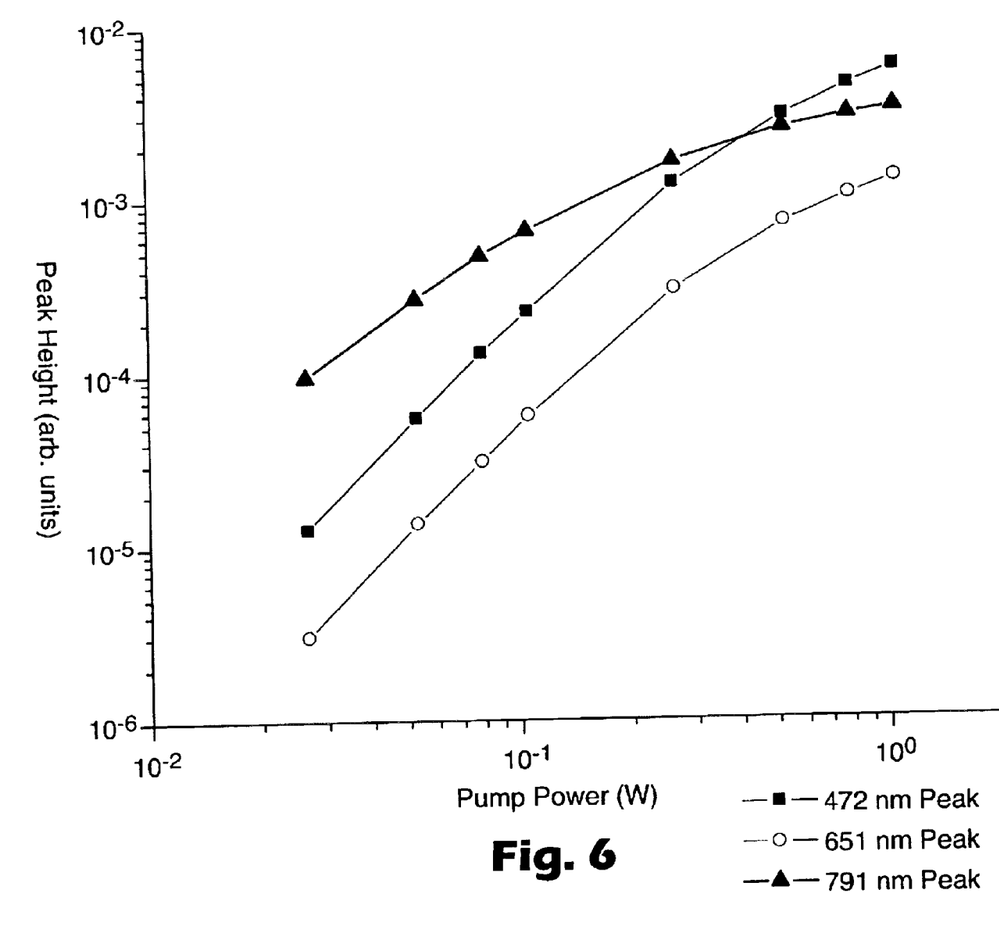
FIG. 6 is a graph showing dependence of fluorescence on pump power in the fiber at three peak wavelengths for fiber C.
Figure 7:
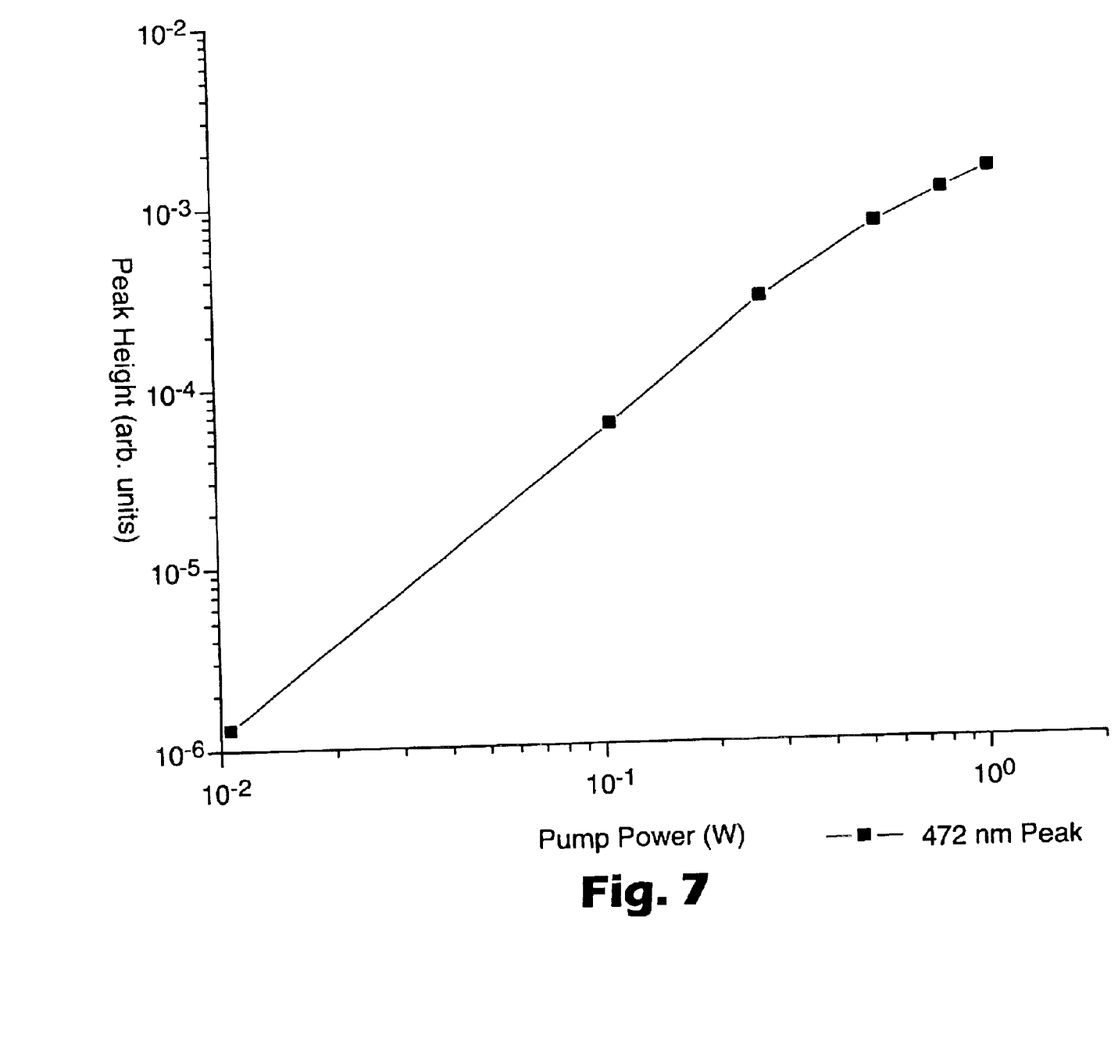
FIG. 7 is a graph showing dependence of fluorescence on pump power in the fiber at a 472 nm peak wavelength for fiber D.

FIG. 6 shows power dependence of emission at the 472 nm, 651 nm, and 791 nm peak wavelength for Fiber C. FIG. 7 shows a similar graph of power dependence at the 472 nm peak wavelength for Fiber D. Both FIG. 6 and FIG. 7 are plotted on a log-log plot with log intensity on the vertical scale and log pump power on the horizontal scale.

FIGS. 6 and 7 show that the intensity of the visible peak at 472 nm for both fibers C and D is linear (on a log-log plot) at low pump power. The slope of the relationship indicates the number of pump photons required to excite the emission. In both FIGS. 6 and 7, the slope at low powers for 472 nm emissions is approximately 2, indicating a two photon process. As shown in FIG. 1, however, the 472 nm emission is from the $^1G_4$ excited state, which is known to require three-pump photons. This discrepancy can be explained by saturation of one of the intermediate metastable states. Saturation occurs when the pump power is high enough that electrons are excited from the ground state to an excited state faster than electrons in that excited state decay back to the ground state. Under these conditions, the ground state can become depleted of electrons and absorption of the pump photons is more likely from an excited state than from the ground state. The excited state becomes a virtual ground state.

As shown in FIG. 6, the power dependence of the 651 nm peak wavelength is essentially parallel to the power dependence for the 472 nm peak wavelength. This is to be expected, since both the 472 nm and 651 nm emissions originate from the $^1G_4$ excited state.

Also shown in FIG. 6 is the 791 nm peak wavelength emission. This emission originates from the $^3F_4$ excited state. At the same low pump powers, the 791 nm peak exhibits a slope of about 1.4 in FIG. 6. This indicates that the $^3H_4$ level, which is the first excited state in $Tm^{3+}$, is saturated by very low (10 mW) pump powers. In other words, ground-state depletion occurs in the inventive compositions at a very low pump power.

At higher pump powers, the slope of the 472 nm peak wavelength decreases, as shown in FIGS. 6 and 7. This indicates that another intermediate state is saturating. In this case, the second intermediate state to saturate is the $^3F_4$ state.

Saturation of the $^3H_4$ level at very low pump powers, and the subsequent saturation of the $^3F_4$ state, indicates that the phonon quenching of the excited states is less significant in the compositions of this invention than in other silicate glass systems.

With the present invention, efficient upconversion is possible to produce bright blue light without significant heat generation. Increasing Tm doping levels increase blue emission at 472 and 455 nm as illustrated in FIG. 5. Testing has indicated that with two watts (2 W) of pumping power from the pumping laser at about 1060 nm, over three meters of fiber are illuminated.

Higher Tm doping levels result in higher absorption of pump energy. As a result, Fiber F having Tm doping of about 17000 ppm exhibits such high absorption of pump power that upconversion and emission of blue light is concentrated over a very short fiber length with significant generation of heat. For applications of the invention using optical fibers, Tm doping concentrations of less than about 4000 ppm are preferred.

Tests were performed to measure the amount of visible light output from the side of the fiber. The system used reported photometric units (lumens), which were then converted into radiometric units (Watts). Test results indicate that about 2% of the pump energy is converted to visible (blue) light and that 99.5% of the visible light is emitted from the first 3 m of fiber. D.C. Hanna, et al., (cited in the Background) report an estimate of the fraction of $Tm^{3+}$ f-shell electrons excited to the $^1G_4$ state when they pump their fiber with 1 W of 1060 nm light. They arrive at an estimate of about $10^{-5}$. A calculation using the data mentioned above and Hanna's value for lifetime (200 $\mu s$) resulted in a value of about $4\times10^{-3}$ for Fiber C pumped with 1W. While the calculation is only a very rough estimate, the difference appears to be significant. It indicates that the upconversion process is much more likely in the fibers of the present invention than it was in the fiber reported on by Hanna. In addition to the difference in composition, the example fibers have a higher NA and a smaller core diameter than the fibers used by Hanna. All of these differences are believed to contribute to the higher upconversion efficiency.

The compositions of the present invention provide an efficient and compact source of blue and ultraviolet light. Many applications are possible, including blue lasers either in rod or fiber form and flexible blue light sources for displays and accent lighting. In addition, the present invention has application to shaped lamps and as light sources for providing either UV light at 365 nm or blue light at 455 nm and 472 nm to cure photopolymers.

Different compositions are best suited for different applications. For example, increasing Tm concentration increases blue and UV emission for a given pump power, but results in higher absorption so that the pump radiation travels a shorter distance along the fiber before being absorbed. In other words, there is a trade off between intensity and length of fiber illuminated based on Tm concentration.

Similarly, the presence of $GeO_2$ in the glass composition can increase upconversion and emission of blue and UV light. The trade-off is an increased tendency to photodarken by the emitted blue and UV light.

Although the present invention has been described with reference to preferred embodiments, workers skilled in the art will recognize that changes in form and detail may be made without departing from the spirit and scope of the invention. For example, although pump radiation at 1060 nm has been discussed, other wavelengths that are absorbed by $Tm^{3+}$ ions may also be used. Other workers have demonstrated upconversion in Tm-doped fibers using pump wavelengths in the range of 600–700 nm (especially around 660 nm). Using pump radiation in this range may be more efficient than 1060 nm. Similarly, although continuous wave laser pumping has been discussed, the upconversion can also be produced using a pulsed pump laser.

What is claimed is:

1. An upconversion light source comprising:
    a silicate glass comprising silica and oxides of Al, La, and Tm; and
    a pump source of a first radiation having a first peak wavelength coupled to the silicate glass;
    wherein the first radiation excites Tm ions in the silicate glass to emit at second radiation having a second peak wavelength shorter than the first peak wavelength.

2. The light source of claim 1, wherein the silicate glass further comprises an oxide of Ge.

3. The light source of claim 1, wherein the silicate glass further comprises an oxide of Er.

4. The light source of claim 1, wherein the silicate glass further comprises oxides of Ge and Er.

5. The light source of claim 4, wherein:
    a concentration of Al is about 0.5 mol % to about 20 mol %;
    a concentration of La is greater than 0 mol % to about 4 mol %;
    a concentration of Ge is from 0 mol % to about 15 mol %;
    a concentration of Er is from 0 ppm to about 3,000 ppm; and
    a concentration of Tm is about 15 ppm to about 10,000 ppm.

6. The light source of claim 1, wherein the silicate glass is a portion of an optical fiber.

7. The light source of claim 1, wherein the first peak wavelength is between about 1000 nm and about 1200 nm.

8. The light source of claim 1, wherein the first peak wavelength is about 1060 nm and the second peak wavelength is between about 450 nm and about 480 nm.

9. The light source of claim 1, wherein the first peak wavelength is about 1060 nm and the second peak wavelength is between about 360 nm and about 370 nm.

10. A curing radiation source including the light source of claim 1.

11. A display device including the light source of claim 1.

12. A method for upconverting first radiation having a first peak wavelength into second radiation having a second peak wavelength that is shorter than the first peak wavelength, the method comprising:
    providing a silicate glass comprising silica and oxides of Al, La, and Tm; and
    irradiating the silicate glass with the first radiation causing the silicate glass to emit the second radiation.

13. The method of claim 12, wherein the silicate glass further includes $GeO_2$.

14. The method of claim 12, wherein the silicate glass further includes $Er_2O_3$.

15. The method of claim 12, wherein the silicate glass further includes oxides of Ge and Er.

16. A light-emitting fiber comprising:
    an optical glass fiber comprising silica and oxides of Al, La, Ge, Er, and Tm; and
    a pump source of a first radiation having a first peak wavelength coupled to the optical fiber to excite Tm ions in the core of the optical glass fiber so that the fiber emits a second radiation having a second peak wavelength, that is shorter than the first peak wavelength.

17. The light-emitting fiber of claim 16, wherein the first peak wavelength is about 1060 nm.

18. An upconversion light source comprising:
   a silicate glass comprising silica and oxides of Al, La, and Tm; and
   a pump source of pump radiation for exciting Tm ions in the silicate glass to $^1G_4$ and $^1D_2$ excited states to produce upconverted emitted radiation.

19. The light source of claim 18, wherein the silicate glass further comprises an oxide of Ge.

20. The light source of claim 18, wherein the silicate glass further comprises an oxide of Er.

21. The light source of claim 18, wherein the silicate glass further comprises oxides of Ge and Er.

22. The light source of claim 21, wherein the silicate glass includes:
   a concentration of Al of about 0.5 mol % to about 20 mol %;
   a concentration of La of greater than 0 mol % to about 4 mol %;
   a concentration of Ge of from 0 mol % to about 15 mol %;
   a concentration of Er of from 0 ppm to about 3,000 ppm; and
   a concentration of Tm of about 15 ppm to about 10,000 ppm.

23. The light source of claim 18, wherein the silicate glass is a portion of an optical fiber.

24. The light source of claim 18, wherein the pump radiation has a peak wavelength of between about 1000 nm to about 1200 nm.

25. The light source of claim 18, wherein the pump radiation has a peak wavelength of about 1060 nm and the upconverted emitted radiation has a peak wavelength between about 450 and about 480 nm.

26. The light source of claim 18, wherein the pump radiation has a peak wavelength of about 1060 nm and the upconverted emitted radiation has a peak wavelength between about 360 nm and about 370 nm.

27. A method producing blue light, the method comprising:
   providing a silicate glass comprising silica and oxides of Al, La, and Tm; and
   irradiating the silicate glass with pump radiation of a wavelength which is absorbed by Tm ions in the silicate glass to cause the Tm ions in the silicate glass to emit blue light.

28. The method of claim 27, wherein the silicate glass further includes $GeO_2$.

29. The method of claim 28, wherein the silicate glass further includes $Er_2O_3$.

* * * * *

UNITED STATES PATENT AND TRADEMARK OFFICE
CERTIFICATE OF CORRECTION

PATENT NO. : 6,879,609 B2
DATED : April 12, 2005
INVENTOR(S) : Schardt, Craig R.

It is certified that error appears in the above-identified patent and that said Letters Patent is hereby corrected as shown below:

Title page,
Item [56], References Cited, U.S. PATENT DOCUMENTS, after "6,463,201" delete "B1" and insert -- B2 --.

Column 4,
Line 53, after "$GeO_2$" insert -- glass). --.

Column 7,
Line 17, after "laser 14." insert -- The coupling efficiency --.

Signed and Sealed this

Seventeenth Day of January, 2006

JON W. DUDAS
*Director of the United States Patent and Trademark Office*